US009887741B2

(12) United States Patent
Rizzo et al.

(10) Patent No.: US 9,887,741 B2
(45) Date of Patent: Feb. 6, 2018

(54) METHOD FOR MANAGING CONTACTLESS COMMUNICATIONS AND CONTACTLESS CHARGING WITHIN A SYSTEM, AND CORRESPONDING SYSTEM

(71) Applicant: STMICROELECTRONICS (ROUSSET) SAS, Rousset (FR)

(72) Inventors: Pierre Rizzo, Trets (FR); Anthony Tornambe, Marseilles (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 14/881,528

(22) Filed: Oct. 13, 2015

(65) Prior Publication Data
US 2016/0218774 A1 Jul. 28, 2016

(30) Foreign Application Priority Data

Jan. 26, 2015 (FR) ...................................... 15 50566

(51) Int. Cl.
*H04B 5/00* (2006.01)
*H02J 7/02* (2016.01)
*H02J 50/12* (2016.01)

(52) U.S. Cl.
CPC ............ *H04B 5/0037* (2013.01); *H02J 7/025* (2013.01); *H02J 50/12* (2016.02); *H04B 5/0031* (2013.01)

(58) Field of Classification Search
None
See application file for complete search history.

(56) References Cited

U.S. PATENT DOCUMENTS

| 9,305,193 | B2 | 4/2016 | Lee et al. | |
|---|---|---|---|---|
| 2006/0255768 | A1* | 11/2006 | Yoshio | H02J 7/0029 320/134 |
| 2012/0149301 | A1* | 6/2012 | Wiley | H04B 5/0031 455/41.1 |
| 2012/0200472 | A1* | 8/2012 | Tramoni | H03H 7/40 343/861 |
| 2012/0235508 | A1 | 9/2012 | Ichikawa | |
| 2013/0225076 | A1* | 8/2013 | Rizzo | H04B 5/0037 455/41.1 |

(Continued)

FOREIGN PATENT DOCUMENTS

| CN | 103117813 A | 5/2013 |
|---|---|---|
| CN | 104038259 A | 9/2014 |
| CN | 104218694 A | 12/2014 |

(Continued)

OTHER PUBLICATIONS

Ryan Tseng et al: "Introduction to the alliance for wireless power loosely-coupled wireless power transfer system specification version 1.0", 2013 IEEE Wireless Power Transfer (WPT), May 1, 2013, pp. 79-83.

*Primary Examiner* — Alejandro Rivero
(74) *Attorney, Agent, or Firm* — Slater Matsil, LLP

(57) ABSTRACT

A system includes an antenna, and communications circuitry coupled to the antenna and configured for at least one of receiving and transmitting information via the antenna based on a contactless communications protocol. A charger is configured for contactless charging a power supply module via the antenna. A controller is configured for selectively operating the communications circuitry and the charger.

24 Claims, 5 Drawing Sheets

(56) References Cited

U.S. PATENT DOCUMENTS

2014/0106668 A1* 4/2014 Krishnan ............ G06K 7/0008
455/41.1
2016/0218774 A1 7/2016 Rizzo et al.

FOREIGN PATENT DOCUMENTS

| CN | 205249222 U | 5/2016 |
|---|---|---|
| WO | 2010035256 | 4/2010 |

* cited by examiner

SCTRL=0

METHOD FOR MANAGING CONTACTLESS COMMUNICATIONS AND CONTACTLESS CHARGING WITHIN A SYSTEM, AND CORRESPONDING SYSTEM

FIELD OF THE INVENTION

Embodiments of the invention and their implementations relate to a contactless transmission of information and a contactless charging (or recharging) of a power supply module, for example, a battery.

BACKGROUND

Contactless or wireless communication is carried out between a reader and an object, for example, a transponder of the tag type, a contactless smartcard or else a mobile telephone emulated in a card mode. These examples are not to be limiting. The reader may also, for example, be a mobile telephone emulated in a reader mode.

Near-field communications, better known by those skilled in the art under the acronym NFC, is a technology for wireless connectivity which allows communications over a short distance, for example, 10 cm. This may be between electronic devices, such as, for example, contactless smartcards or mobile telephones emulated in a card mode, and readers. NFC technology is particularly suited to connecting any type of user device and enables fast and easy communications.

A contactless object is an object capable of exchanging information via an antenna with another contactless object, for example, a reader. The information may be exchanged according to a contactless communications protocol.

An NFC object, which is a contactless object, is an object compatible with NFC technology. NFC technology is an open technology platform standardized in the standards ISO/IEC 18092 and ISO/IEC 21481 but incorporates numerous already existing standards such as, for example, the type A and type B protocols defined in the standard ISO-14443 which can be communications protocols that may be used in NFC technology.

Aside from its conventional function of a telephone, a cellular mobile telephone may be used (if it is equipped with specific means or circuitry) for exchanging information with another contactless device, for example, a contactless reader, using a contactless communications protocol used in NFC technology.

This allows information to be exchanged between the contactless reader and secure elements situated in the mobile telephone. Numerous applications are thus possible, such as mobile ticketing in public transportation (the mobile telephone functions as a travel ticket) or mobile payments (the mobile telephone functions as a payment card).

When information is transmitted between a reader and an object emulated in a tag or card mode, the reader generates a magnetic field by its antenna which is generally, in the standards conventionally used, operates at a frequency of 13.56 MHz.

On the other side, the antenna of the object emulating the tag modulates the field generated by the reader. This modulation is carried out by modifying the load connected to the terminals of the antenna of the object.

By modifying the load across the terminals of the antenna of the object, the output impedance of the antenna of the reader changes due to the magnetic coupling between the two antennas. This results in a change in the amplitudes and/or the phases of the voltages and currents present on and in the antennas of the reader and of the object. So, in this way, the information to be transmitted from the object to the reader is transmitted via load modulation to the antenna of the reader.

Furthermore, the contactless charging technology allows the contactless transfer of energy from a source of energy (for example, a charger) to a load, for example, a wireless communications device such as a cellular mobile telephone, across the air space separating the charger and the load.

Among the various standards for contactless charging, the A4WP (Alliance for Wireless Power) standard is among one of the standards chosen by the main manufacturers of smart cellular mobile telephones (or smartphones).

Numerous publications exist on the specifications of the A4WP standard to which those skilled in the art can refer to at their convenience. The article by Ryan Tseng et al. may notably be cited, which is titled "Introduction to the Alliance for Wireless Power Loosely-Coupled Wireless Power Transfer System Specification Version 1.0," IEEE Wireless Power Transfer Conference 2013, Technologies, Systems and Applications, May 15-16, 2013, Perugia, Italy.

In summary, contactless energy is transferred from a Power Transmitter Unit (PTU) to a Power Receiving Unit (PRU) controlled by a management protocol for the charging process. The contactless energy is generated at a frequency equal to 678 MHz.

SUMMARY

According to one embodiment and its implementation, the objective may be to combine, within the same system, in a simple and compact manner, a contactless communications function, for example, of the NFC communications type, and a contactless charging function, for example, according to the A4WP specification.

These functions may be combined while ensuring that the charging path does not influence the performance characteristics of the contactless communication, and that the characteristics of the charging process do not damage the components dedicated to the contactless communication. These functions also ensure that the characteristics of the contactless communications do not impact the efficiency of the power transfer.

Thus, according to one aspect, a method may be provided for managing operation of a system incorporated within a wireless communications device, for example, such as a cellular mobile telephone or a tablet, incorporating a contactless communications function and a contactless charging function for a power supply module, such as a rechargeable battery. According to this method, the contactless communication and the contactless charging may be carried out in a selective manner via the same antenna.

The use of a single antenna in combination with a selective activation of the contactless communications or of the contactless charging may allow a system having a reduced surface area to be obtained.

Furthermore, the contactless communications function may advantageously be isolated from the antenna when the contactless charging function is operational, and vice-versa. Thus, this contributes to minimizing or reducing the influence of one function on the other, and may contribute to the contactless communications function not impacting the efficiency of the power transfer.

The contactless communications function or the contactless charging function may be selected by configuring a matching circuit connected to the terminals of the antenna in two different ways. This allows frequency switching to be carried out between the frequency used for the contactless communication and the frequency used for the contactless charging.

Furthermore, the configuration of the matching circuit for selecting the contactless charging function may also allow the contactless communications function to be isolated from the antenna. Thus, the same means (e.g., the configurable matching circuit) may be used to effect frequency switching and to isolate the contactless communications function from the antenna when the contactless charging function is activated.

When the contactless charging function is selected, this function may be rendered operational by a configuration of a control block connected between the antenna and the power supply module. When the contactless communications function may be selected, the contactless charging function may be isolated from the antenna by another configuration of the control block.

This control block may comprise a PMOS transistor controlled on its gate by an NMOS transistor, for example, and contributes depending on its configuration (PMOS transistor off or otherwise) to rendering the contactless charging function operational. Otherwise, the control block isolates the contactless charging function from the antenna when the contactless communications function is rendered operational.

A system may be provided comprising an antenna, communication means or communications circuitry configured for receiving and/or transmitting information via the antenna according to a contactless communications protocol, and charging means or a charger may be configured for carrying out a contactless charging of a power supply module via the antenna. Control means or a controller may be configured for selectively rendering operational the communications circuitry or the charger. The controller may furthermore be configured for isolating from the antenna those of the communications circuitry or of the charger not rendered operational.

The communications circuitry may be configured for receiving and/or transmitting information via the antenna at a first frequency. The charger may be configured for carrying out a contactless charging of the power supply module via the antenna at a second frequency. The controller may comprise a first configurable control means or control circuitry designed both to select the communications circuitry or the charger by frequency switching between the first and second frequencies and to isolate from the antenna the communications circuitry when the charger is selected.

The first control block may comprise a configurable matching circuit coupled to the antenna having a first configuration in which it forms, with the antenna, a first resonant circuit having the first frequency as a resonance frequency or else it forms an impedance-matched circuit compatible with the transmission/reception of information via the antenna at the first frequency. The first control block may also comprise a second configuration in which it forms, with the antenna, a second resonant circuit having the second frequency as a resonance frequency.

The communication circuitry may comprise an input and output interface, and in the first configuration, the matching circuit may be connected between the antenna and the input and output interface. In the second configuration, the matching circuit may be connected between the antenna and a power supply cold point, and the input and output interface may also be connected to the power supply cold point.

The matching circuit may comprise a first capacitor connected in parallel with the terminals of the antenna and several second capacitors respectively connected in series between the terminals of the antenna and the input/output interface. The first control block may furthermore comprise a first controllable switching module connected between the input/output interface and the power supply cold point and have a first state in which an effective connection between the input/output interface and the power supply cold point is forbidden or prevented. The matching circuit may then be in its first configuration, and a second state in which it effectively connects the input/output interface to the power supply cold point, with the matching circuit then being in its second configuration. The controller may comprise first control means or first control circuitry configured for selectively controlling the first switching module.

The first switching module may comprise several MOS transistors respectively connected between the second capacitors and the power supply cold point and may be controlled on their respective gate by a first control signal delivered by the first control circuitry.

The controller may furthermore comprise a second controllable and configurable control block designed to render the charger operational when the first control block has selected the charger and to isolate the charger from the antenna when the communications circuitry is rendered operational.

The second control block may be connected between the antenna and the rechargeable power supply module and has a first state in which an effective connection between the antenna and the power supply module is prevented. The charger may then be non-operational. The second control block may have a second state in which it effectively connects the antenna to the power supply module. The charger may then be rendered operational, and the controller may comprise second control means or a second control circuitry for selectively controlling the second control block.

The charger may comprise a rectifier bridge connected to the terminals of the antenna, and a power supply management unit connected between the rectifier bridge and the rechargeable power supply module. The second control block may then be disposed between the rectifier bridge and the power supply management unit and may comprise a PMOS transistor connected between an output of the rectifier bridge and the power supply management unit. The second control block may be controlled on its gate in such a manner as to be turned off in the first state and conducting in the second state.

The second control block may comprise an NMOS transistor connected between the gate of the PMOS transistor and ground and be controlled by a second control signal delivered by the second control circuitry in such a manner as to turn off or to render conducting the PMOS transistor.

The first control circuitry and the second control circuitry may be the same. The first switching module and the second control block may both be either in their first state or in their second state.

The communications circuitry may be of the "near field communications" type and the charger may be compatible with the contactless charging technology A4WP.

A device may be provided, for example, a cellular mobile telephone, incorporating a system as defined above.

BRIEF DESCRIPTION OF THE DRAWINGS

Other advantages and features of the invention will become apparent upon examining the detailed description of non-limiting embodiments and their implementation, and the appended drawings, in which.

DETAILED DESCRIPTION

Figure 1:
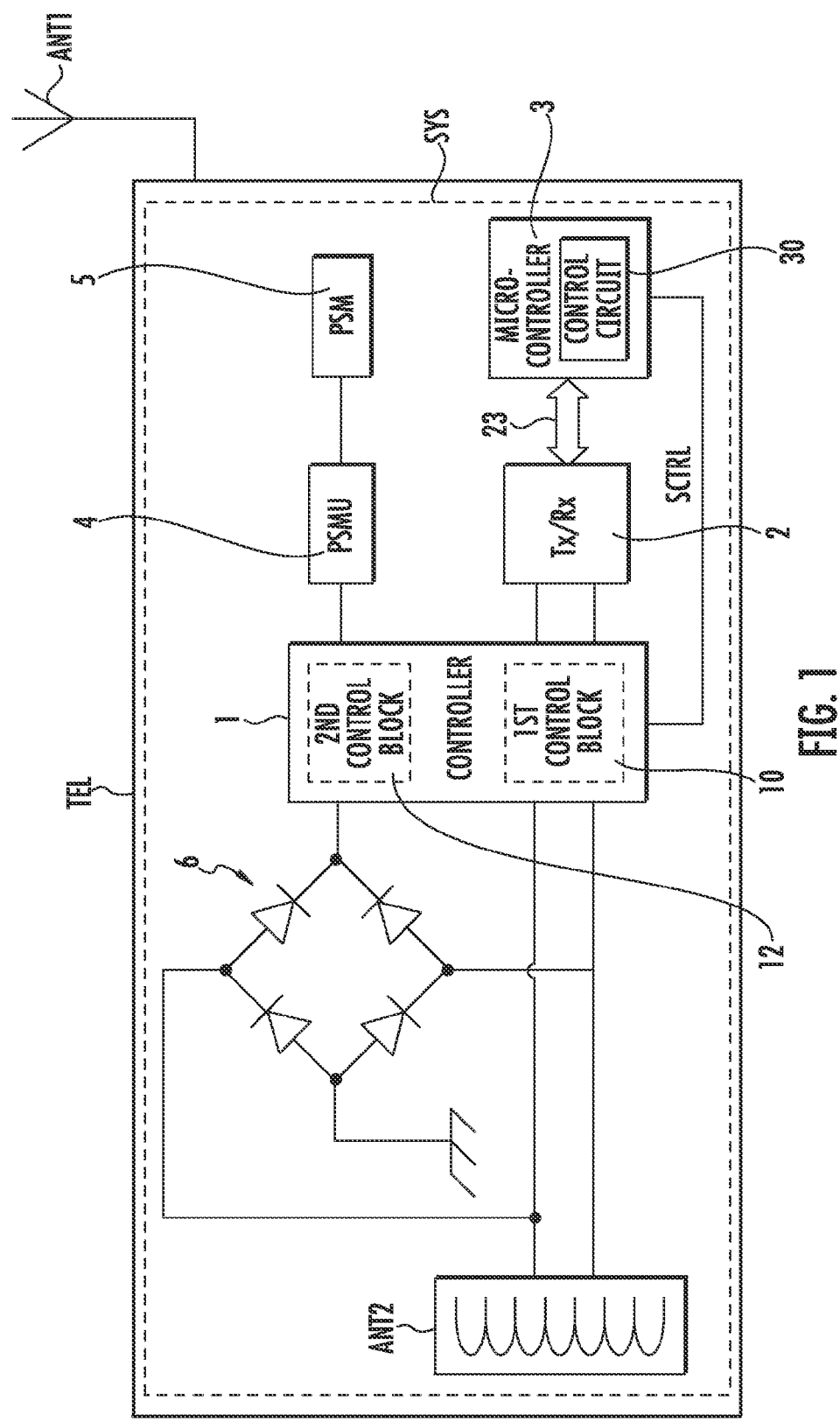
FIGS. 1 to 8 illustrate schematically embodiments of the invention and their implementation.
Figure 2:
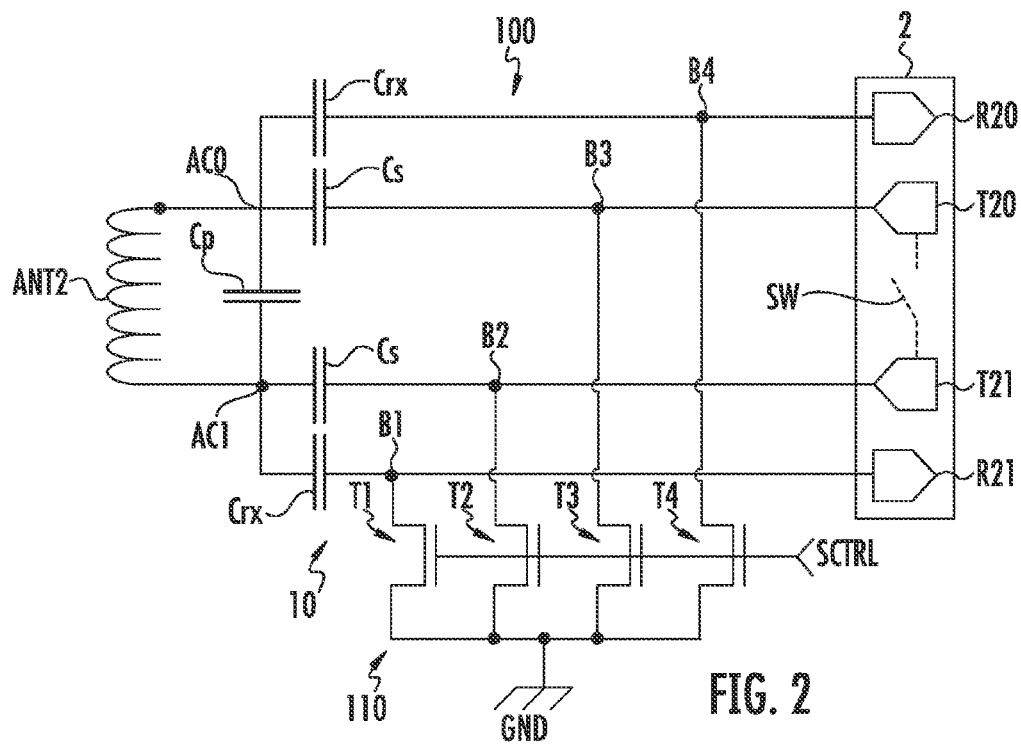

In FIG. 1, the reference TEL denotes a communications device, for example, a cellular mobile telephone equipped with an antenna ANT1 for establishing telephone communications.

The telephone TEL also comprises a system SYS capable, as will be seen in more detail below, of implementing a contactless communications function with an external device or a contactless charging of a power supply module 5, for example, a battery. This is implemented via an antenna ANT2, here an inductive antenna. In other words, the antenna ANT2 is used for contactless communications with the external device and for contactless charging of the battery 5.

The system SYS comprises communication means or communications circuitry configured for receiving and/or transmitting information via the antenna ANT2 according to a contactless communications protocol. By way of example, the communication means comprises a transmission/reception device or a transmission/reception head 2 with a conventional structure and notably comprising means or circuitry for modulation/demodulation of frames. The communication means also comprises a frame controller designed notably to calculate parity bits according to a predefined logical function, for example, as defined in the standard ISO 14443.

The communication means also comprise a host microcontroller 3 connected to the device 2 via a bus 23. The host microcontroller 3 is, for example, an NFC microcontroller comprising, for example, a conventional central processing unit associated with various memories.

The charging means or charger for the battery 5 comprises a rectifier bridge 6 connected to the two terminals of the antenna ANT2 together with a power supply management unit 4 (known by those skilled in the art under the acronym PMU for Power Management Unit) connected between the rectifier bridge 6 and the rechargeable battery 5.

The system SYS also comprises control means or a controller configured for selectively rendering operational the communication means or the charging means. Furthermore, as will be seen in more detail below, the control means may furthermore be configured for isolating from the antenna ANT2 those of the communication means or of the charging means that are not rendered operational.

The control means comprise, as illustrated in FIG. 1, a stage 1 comprising a first control block 10 and a second control block 12. These two control blocks are configurable and controllable by a control signal SCTRL delivered by control means 30 in the microcontroller 3 and implemented, for example, in the form of software. As a variation, the control means could be disposed within the radio frequency head 2. The radio frequency head 2 could also incorporate the stage 1 together with the rectifier bridge 6 dedicated to the contactless charging.

Reference is now more particularly made to FIGS. 2 to 5 to illustrate one exemplary embodiment of the first control block 10 and of its various configurations. The first control block 10 comprises (FIG. 2) a configurable matching circuit 100 coupled to the two terminals AC0 and AC1 of the antenna ANT2.

Before returning in more detail to the composition of the matching circuit 100, it should be noted that the transmission/reception head 2 comprises an input and output interface having two contacts T20 and T21 used in a reader mode and two other contacts R20 and R21 used in a reader mode and in a card mode.

For this purpose, the head 2 is advantageously equipped with an internal switch SW allowing the contacts T20 and T21 to be short-circuited for an operation in a card mode, or the contacts are not short-circuited so as to permit an operation in a reader mode.

The matching circuit comprises a first capacitor Cp connected in parallel with the terminals AC0 and AC1 of the antenna ANT2 and also with the contacts T20 and T21. The matching circuit also comprises second capacitors Cs and Crx.

More precisely, a second capacitor Cs is connected in series between the terminal AC0 and the contact T20. Another second capacitor Cs is connected in series between the terminal AC1 and the contact T21. Two other second capacitors Crx are respectively connected in series between the terminals AC0, AC1 and the contacts R20 and R21.

Figure 4:
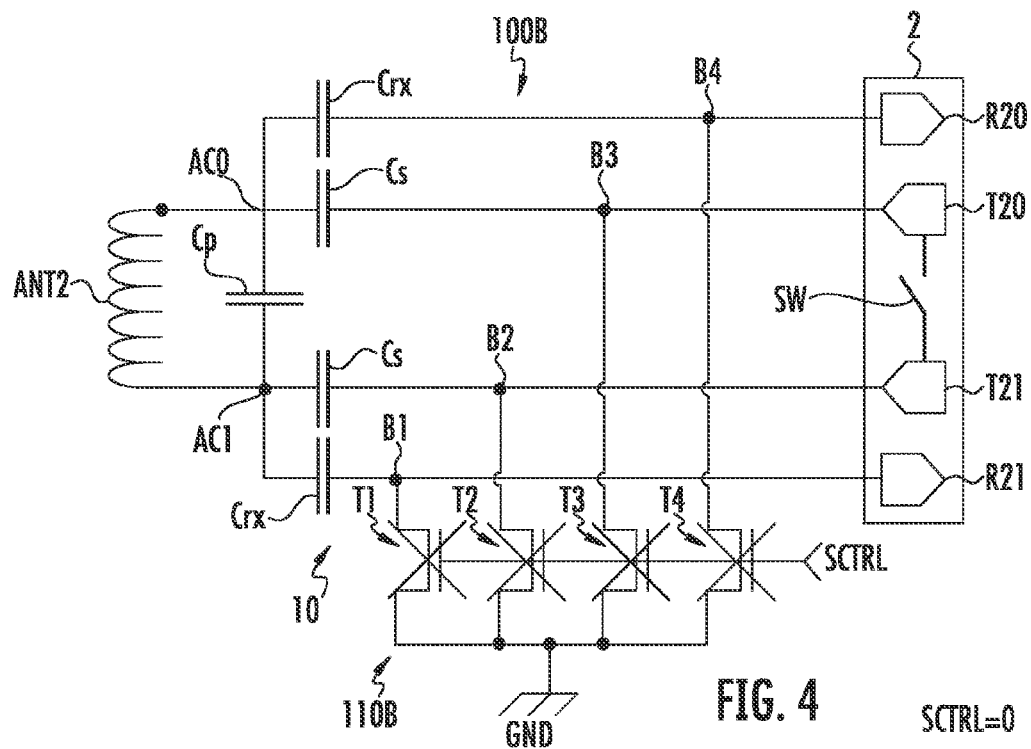
Figure 5:
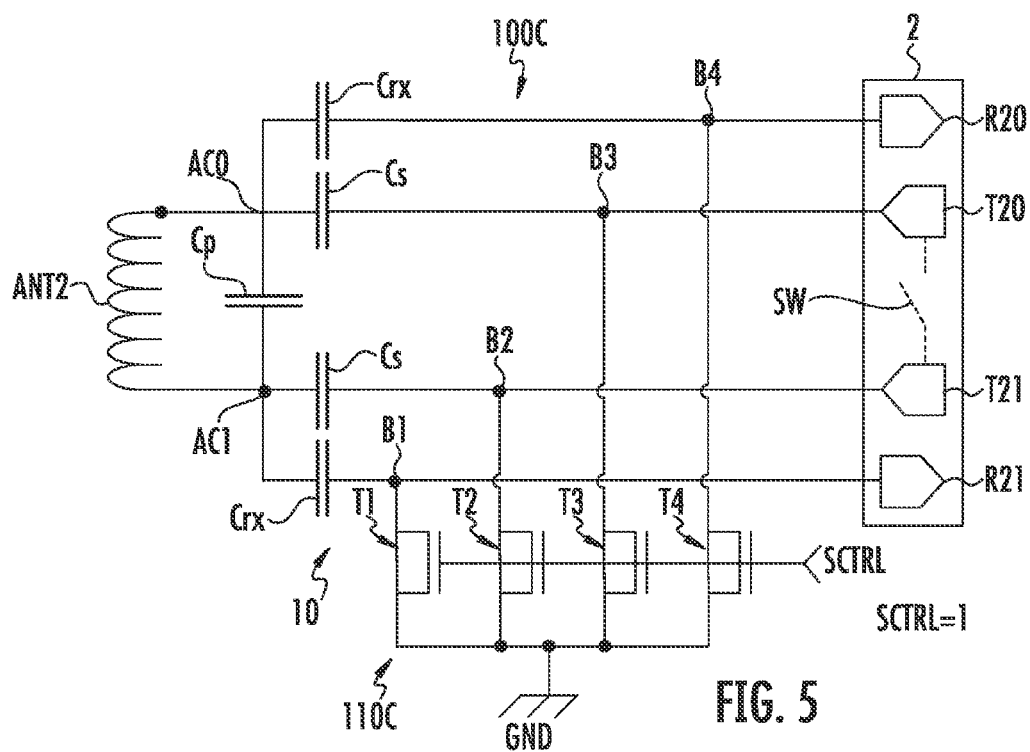

The first control block 10 also comprises a first switching module 110 controlled by the control signal SCTRL. This first switching block comprises four transistors NMOS T1-T4 respectively connected between the terminals B1-B4 of the capacitors Cs and Crx and a power supply cold point, such as ground, The gates of these transistors NMOS are controlled by the control signal SCTRL. This matching circuit 100 can take various configurations as illustrated in FIGS. 3 to 5.

Figure 3:
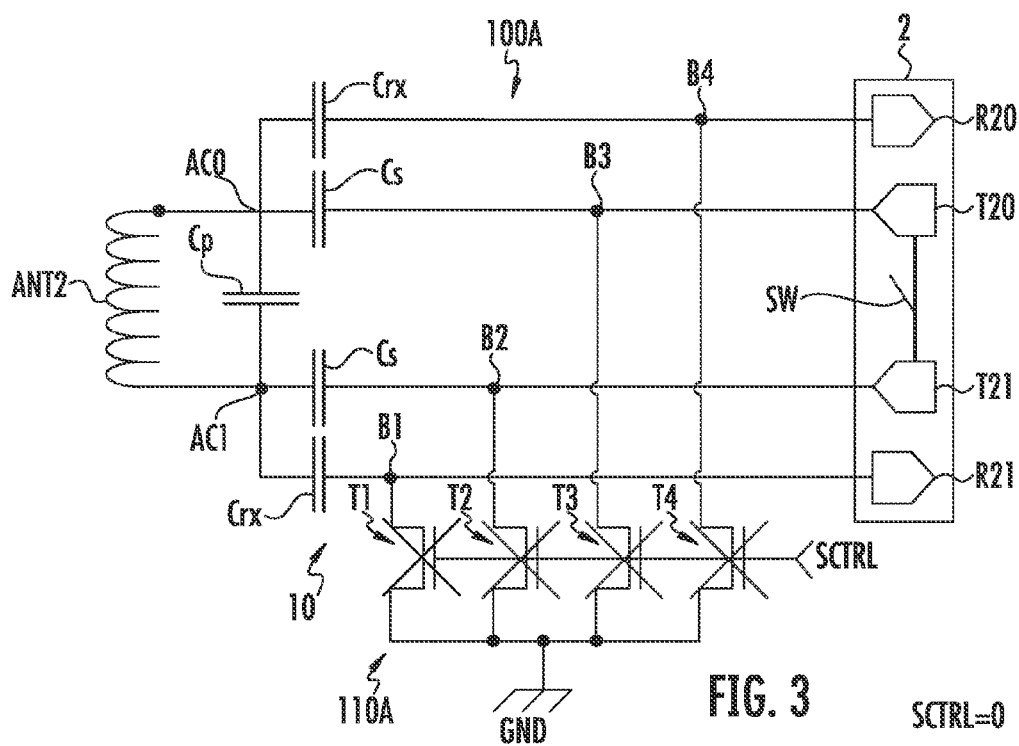

In FIG. 3, it is assumed that the internal switch SW is closed, which corresponds to a use of the communication means in a card mode. In this configuration, the control signal SCTRL is at the logical state 0 corresponding to a selection of the contactless communications function and to a first state 110A of the first switching module 100.

The transistors T1 to T4 are turned off and the matching circuit 100 then forms a resonant circuit 100A with the antenna ANT2. More precisely, the capacitors Cp and Cs form, at the terminals of the antenna, an equivalent capacitor Ct whose value is equal to Cp+Cs/2. For the purposes of simplification Ct, Cp and Cs denote both the corresponding capacitors and their capacitive values.

In the case of a communications protocol of the type A or B as defined in the standard ISO/IEC 14443, for example, the capacitive values Cp and Cs are chosen in such a manner that the resonant circuit has a first resonance frequency if equal to 13.56 MHz.

In the case of FIG. 4, the first switching module 110 is still in its first state 110A corresponding to the logic value 0 of the signal SCTRL. On the other hand, in this example, the internal switch SW is open, which corresponds to the use of the communication means in a reader mode.

In this case, the matching circuit, in its first configuration, forms an impedance-matched circuit 100B compatible with the transmission/reception of information via the antenna ANT2 at the first frequency f. In this configuration, the impedance-matched circuit allows an impedance seen from the contacts T20 and T21 to be obtained which is the complex conjugate of the impedance of the antenna ANT2.

In the case of a communications protocol using the first frequency of 13.56 MHz, when square-wave voltage signals in phase opposition are generated on the contacts T20 and T21 having rising edges separated by 70 ns (corresponding to the frequency of 13.56 MHz), in view of the presence of the matched circuit 100B, a sinusoidal voltage signal whose peaks or maximum values are also spaced by 70 ns is received on the contacts R20 and R21 from the antenna ANT2 and from an EMI (Electromagnetic Interference)

filter connected between the contacts T20 and T21. These are not shown in the figures for the sake of simplification.

A perfect phase matching of the antenna corresponds to an alignment of the rising edges of the square-wave signal with the respective maximum values of the sinusoidal signal.

Reference is now made to FIG. 5 in order to describe a second configuration of the matching circuit 100 corresponding to a logic value 1 of the control signal SCTRL. In other words, to a selection of the contactless charging function.

In order to obtain this second configuration, the first switching block 110 goes into a second state 110C in which the transistors T1 to T4 are conducting.

For this reason, the terminals B1 to B4 are connected to ground and the matching circuit forms across the terminals AC0 and AC1 of the antenna ANT2 a capacitive circuit having a capacitive value equal to Ct+Crx/2. Here again, for the purposes of simplification, Crx denotes both the corresponding capacitor and its capacitive value.

This capacitive circuit forms, with the antenna ANT2, a resonant circuit, and by choosing a capacitive value for the capacitors Crx equal to six times the value Ct, this resonant circuit will have a second resonance frequency equal to 6.78 MHz. This is compatible with a contactless charging notably conforming to the A4WP specifications.

Furthermore, not only has a switching between the resonance frequency used during the contactless communication and the resonance frequency used during a contactless charging been implemented, but this switching has also enabled the contacts T20, T21, R20 and R21 to be grounded. This allows them to be protected and the contactless communications function to be isolated from the antenna during a contactless charging.

By way of example, in order to have a resonance frequency at 13.56 MHz (NFC card mode, FIG. 3), a resonance frequency at 6.78 MHz (contactless charging mode, FIG. 5), and in order to have a good impedance match between the contacts T20, T21 and the antenna ANT2 (NFC reader mode, FIG. 4), by way of a non-limiting example for the capacitors Cp, Cs and Crx, the following capacitive values could be chosen:

Cp=76 pF, Cs=32 pF, Crx=552 pF

This is for antenna ANT2 having a inductive value of 1.5 pH. These values thus allow a value Ct equal to 92 pF and a value of Crx equal to 6 times the value Ct to be obtained.

Figure 6:
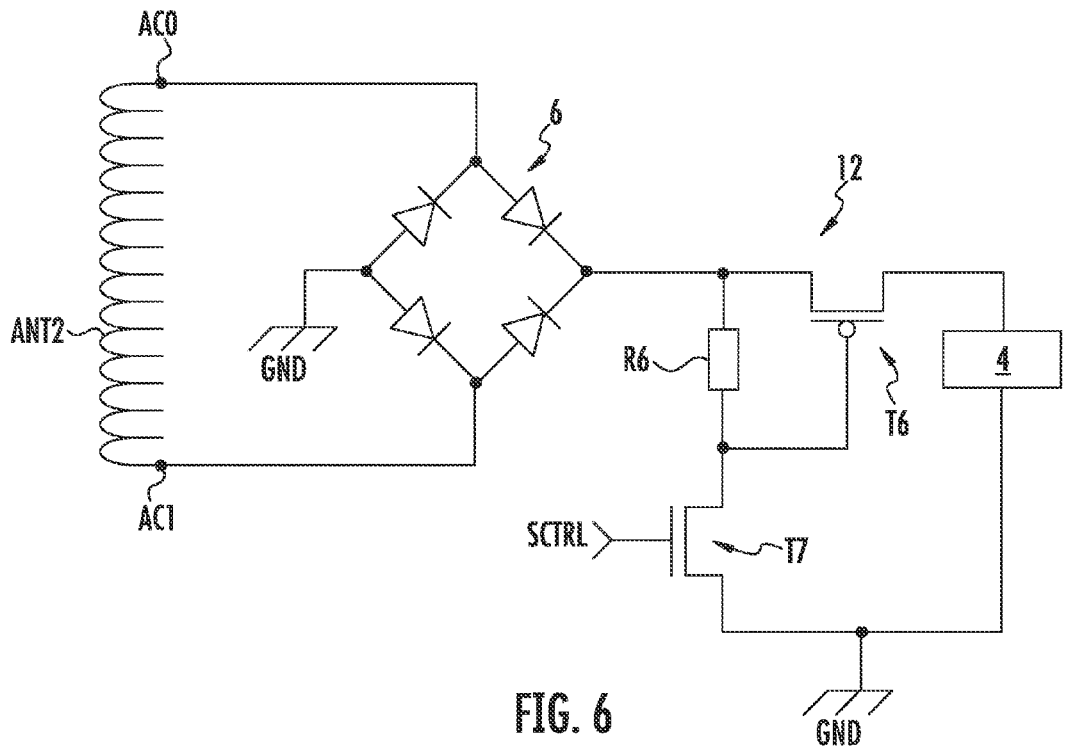
Figure 7:
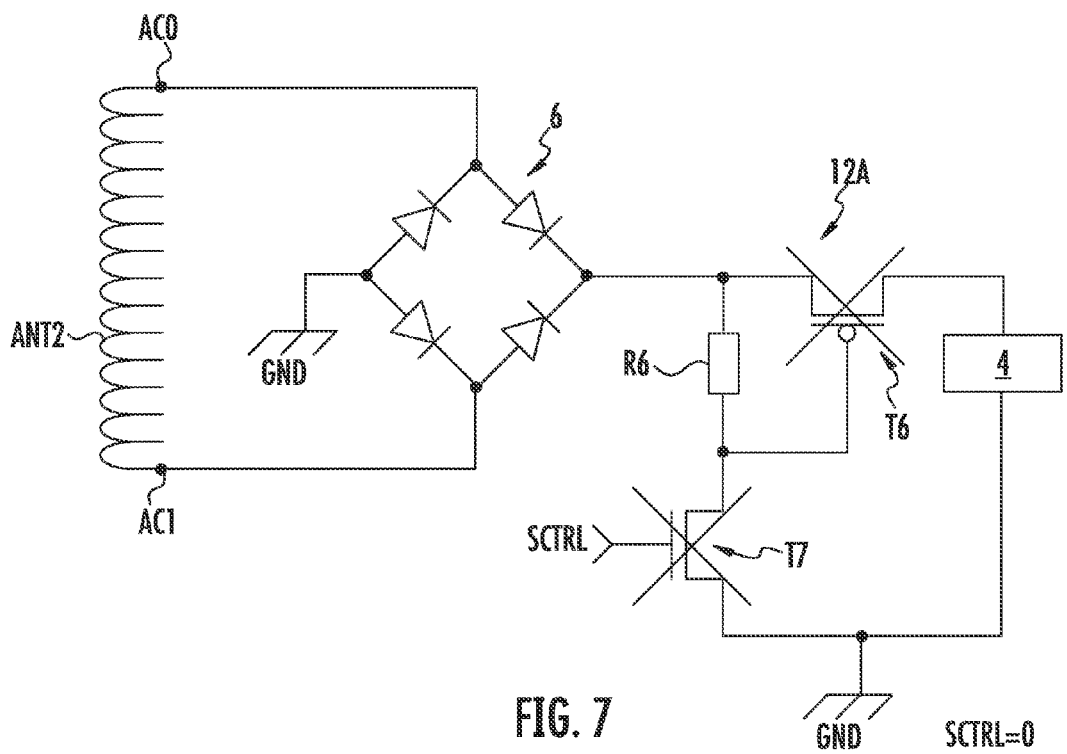
Figure 8:
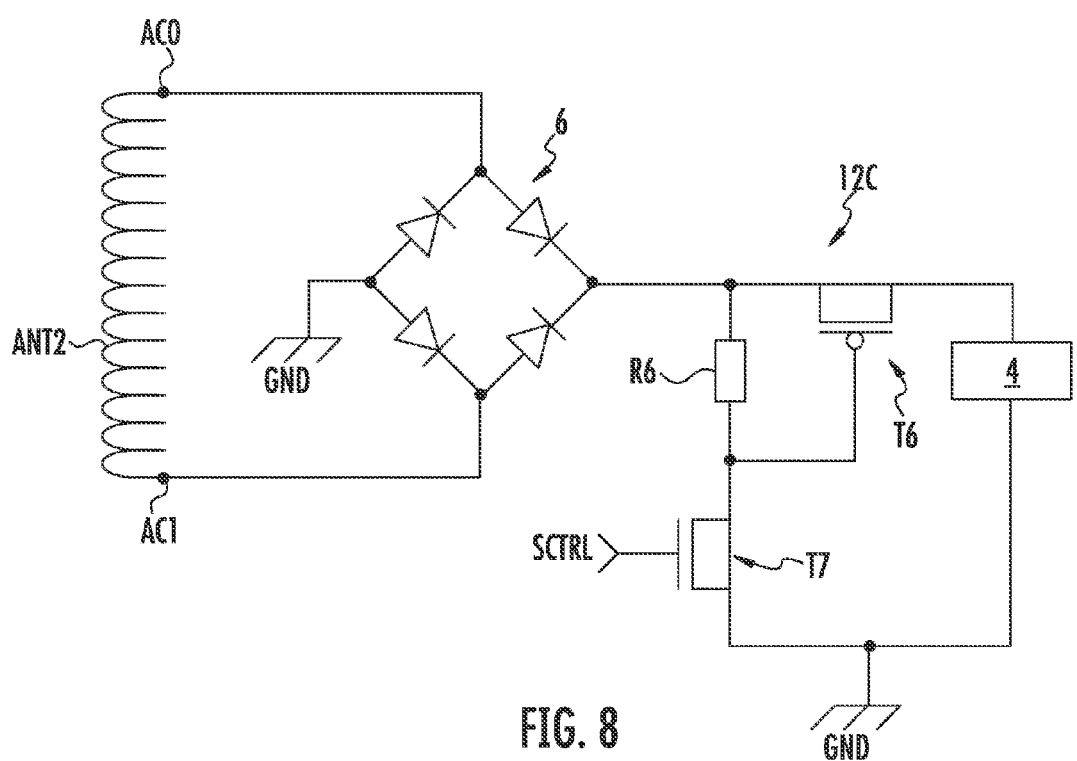

Reference is now more particularly made to FIGS. 6 to 8 to describe in more detail the second control block 12 of the control means 1. As illustrated in FIG. 6, the second control block 12 comprises a PMOS transistor T6 connected in series between an output of the rectifier bridge 6 and the power supply management unit 4. Furthermore, a resistor R6 is connected between the output of the rectifier bridge and the gate of the transistor T6.

The second control block also comprises an NMOS transistor T7 connected between the gate of the PMOS transistor T6 and ground GND. This NMOS transistor T7 is controlled on its gate by the control signal SCTRL.

The second control block is designed to render the charging means operational when the first control block 10 has selected the charging means (SCTRL=1) and to isolate the charging means from the antenna ANT2 when the communication means are rendered operational (SCTRL=0).

For this purpose, as illustrated in FIG. 7 corresponding to a selection of the contactless communication means (SCTRL=0), the second control block has a first state in which the NMOS transistor T7 is turned off, which consequently turns off the PMOS transistor T6.

In this first state 12A, the charging means 4 are then non-operational since there is no effective connection between the antenna ANT2 and the power supply module (battery). The charging means are then effectively isolated from the antenna ANT2 and do not interfere with the operation of the contactless communication.

The second control block also has a second state 12C, illustrated in FIG. 8, corresponding to a selection of the contactless charging function (SCTRL=1). In this state, the NMOS transistor T7 is conducting, which makes the PMOS transistor T6 conduct and effectively connects the power supply management unit 4 to the rectifier bridge 6, and as a consequence, to the antenna ANT2. The charging means are then rendered operational.

That which is claimed is:

1. A method for operating a system comprising:
providing communications circuitry coupled to an antenna for communicating with the antenna based on a contactless communications protocol;
providing a configurable matching circuit coupled between the antenna and the communications circuitry, the configurable matching circuit comprising a plurality of capacitive elements directly coupled to the antenna, without intervening circuitry therebetween, to form first nodes, the plurality of capacitive elements further directly coupled to the communications circuitry, without intervening circuitry therebetween, to form second nodes;
providing a charger for contactless charging of a power supply module via the antenna, wherein the charger is directly coupled to the antenna, without intervening circuitry therebetween, via the first nodes; and
operating a controller for selectively operating the communications circuitry and the charger, the controller comprising
a first control block configured to select the communications circuitry or the charger, to isolate the second nodes from a ground potential when the communications circuitry is selected, and to isolate the communications circuitry from the antenna when the charger is selected by coupling the second nodes to the ground potential, and wherein the charger, the plurality of capacitive elements, and the antenna remain directly coupled to each other via the first nodes and without intervening circuitry therebetween when the communications circuitry is selected and when the charger is selected, and
a second control block configured to make the charger operational when the first control block has selected the charger, and to isolate the charger from the antenna when the communications circuitry is operational.

2. The method according to claim 1, wherein the communications circuitry operates at a first frequency, the charger operates at a second frequency, and wherein the first control block is configured to select the communications circuitry or the charger by frequency switching between the first and second frequencies.

3. The method according to claim 2, the plurality of capacitive elements having
a first configuration forming with the antenna at least one of a first resonant circuit having the first frequency as a resonance frequency, and a matched circuit with an impedance compatible with receiving and transmitting information via the antenna at the first frequency; and a second configuration forming with the antenna a second resonant circuit having the second frequency as a resonance frequency.

4. The method according to claim 3, wherein the power supply module is coupled to a voltage reference; and wherein the communications circuitry comprises input and output interfaces, and
in the first configuration, the matching circuit is coupled between the antenna and the input and output interfaces; and
in the second configuration, the matching circuit is coupled between the antenna and the voltage reference of the power supply module with the input and output interfaces also being coupled to the voltage reference of the power supply module.

5. The method according to claim 4, wherein the antenna comprises a pair of terminals; and wherein the plurality of capacitive elements comprises:
a first capacitor coupled in parallel with the pair of terminals of the antenna; and
a plurality of second capacitors respectively coupled in series between the terminals of the antenna and the input and output interfaces; and
wherein the first control block further comprises a first controllable switching module coupled between the input and output interfaces and the voltage reference of the power supply module and having
a first state in which a connection between the input and output interfaces and the voltage reference of the power supply module is prevented, with the matching circuit then being in the first configuration, and
a second state in which a connection between the input and output interfaces to the voltage reference of the power supply module is allowed, with the matching circuit then being in the second configuration; and
the communications circuitry further comprising a first control circuit configured to selectively control the first controllable switching module.

6. The method according to claim 2, wherein the second control block is coupled between the antenna and the power supply module, and has
a first state in which a connection between the antenna and the power supply module is prevented, with the charger then being non-operational; and
a second state in which the antenna is coupled to the power supply module, with the charger being operational; and
the communications circuitry further comprising a first control circuit configured for selectively controlling the second control block.

7. A system comprising:
an antenna;
communications circuitry coupled to said antenna and configured for at least one of receiving and transmitting information via said antenna based on a contactless communications protocol;
a power supply module;
a configurable matching circuit coupled between the antenna and the communications circuitry, the configurable matching circuit comprising a plurality of capacitive elements directly coupled to the antenna, without intervening circuitry therebetween, to form first nodes, the plurality of capacitive elements further directly coupled to the communications circuitry, without intervening circuitry therebetween, to form second nodes, the first nodes being controllably coupled to the power supply module;

a charger configured for contactless charging said power supply module via said antenna, wherein the charger is directly coupled to the antenna, without intervening circuitry therebetween, via the first nodes; and
a controller comprising
a first control block configured to select said communications circuitry or said charger, to isolate the second nodes from a ground potential when the communications circuitry is selected, and to isolate said communications circuitry from said antenna when said charger is selected by coupling the second nodes to the ground potential, and wherein the charger, the plurality of capacitive elements, and the antenna remain directly coupled to each other via the first nodes and without intervening circuitry therebetween when the communications circuitry is selected and when the charger is selected, and
a second control block configured to make said charger operational when said first control block has selected said charger, and to isolate said charger from said antenna when said communications circuitry is operational.

8. The system according to claim 7, wherein said communications circuitry is configured to operate at a first frequency, said charger is configured to operate at a second frequency, and wherein said first control block is configured to select said communications circuitry or said charger by frequency switching between the first and second frequencies.

9. The system according to claim 8, the plurality of capacitive elements having
a first configuration forming with said antenna at least one of a first resonant circuit having the first frequency as a resonance frequency, and a matched circuit with an impedance compatible with receiving and transmitting information via said antenna at the first frequency; and
a second configuration forming with said antenna a second resonant circuit having the second frequency as a resonance frequency.

10. The system according to claim 9, wherein said power supply module is coupled to a voltage reference; and wherein said communications circuitry comprises input and output interfaces, and
in the first configuration, the matching circuit is coupled between said antenna and the input and output interfaces; and
in the second configuration, the matching circuit is coupled between said antenna and the voltage reference of said power supply module with the input and output interfaces also being coupled to the voltage reference of said power supply module.

11. The system according to claim 10, wherein said antenna comprises a pair of terminals; and wherein the plurality of capacitive elements comprises:
a first capacitor coupled in parallel with the pair of terminals of said antenna; and
a plurality of second capacitors respectively coupled in series between the terminals of said antenna and the input and output interfaces; and
wherein said first control block further comprises a first controllable switching module coupled between the input and output interfaces and the voltage reference of said power supply module and having
a first state in which a connection between the input and output interfaces and the voltage reference of said power supply module is prevented, with the matching circuit then being in the first configuration, and a second state in which a connection between the input and output interfaces to the voltage reference of said power supply module is allowed, with the matching circuit then being in the second configuration; and said communications circuitry further comprising a first control circuit configured to selectively control said first controllable switching module.

12. The system according to claim 11, wherein said first controllable switching module comprises a plurality of transistors respectively coupled between said plurality of second capacitors and the voltage reference of said power supply module, with said plurality of transistors each comprising a gate and being controlled by a first control signal delivered by said first control circuit to said gates.

13. The system according to claim 8, wherein said second control block is coupled between said antenna and said power supply module, and has a first state in which a connection between said antenna and said power supply module is prevented, with said charger then being non-operational; and a second state in which said antenna is coupled to said power supply module, with said charger being operational; and said communications circuitry further comprising a first control circuit configured for selectively controlling said second control block.

14. The system according to claim 7, wherein said communications circuitry operates based on near field communications.

15. The system according to claim 7 wherein said communications circuitry is configured to operate as a cellular mobile telephone.

16. A system comprising:

an antenna comprising a pair of terminals;

communications circuitry coupled to said antenna and configured for at least one of receiving and transmitting information via said antenna based on a contactless communications protocol;

a power supply module;

a configurable matching circuit coupled between the antenna and the communications circuitry, the configurable matching circuit comprising a plurality of capacitive elements directly coupled to the pair of terminals of the antenna, without intervening circuitry therebetween, to form first nodes, the plurality of capacitive elements further directly coupled to the communications circuitry, without intervening circuitry therebetween, to form second nodes, the first nodes being controllably coupled to the power supply module;

a charger, comprising a rectifier bridge coupled to the pair of terminals of said antenna, the charger configured for contactless charging said power supply module via said antenna, wherein the rectifier bridge is directly coupled to the antenna, without intervening circuitry therebetween, via the first nodes; and a controller comprising a first control block configured to select said communications circuitry or said charger, to isolate the second nodes from a ground potential when the communications circuitry is selected, and to isolate said communications circuitry from said antenna when said charger is selected by coupling the second nodes to the ground potential, and wherein the rectifier bridge, the plurality of capacitive elements, and the antenna remain directly coupled to each other via the first nodes and without intervening circuitry therebetween when the communications circuitry is selected and when the charger is selected, and a second control block configured to make said charger operational when said first control block has selected said charger, and to isolate said charger from said antenna when said communications circuitry is operational, said second control block comprising a transistor connected between an output of said charger and said power supply module, said transistor comprising a gate that is controlled so as to be turned off in a first state and conducting in a second state.

17. The system according to claim 16, wherein said communications circuitry is configured to operate at a first frequency, said charger is configured to operate at a second frequency, and wherein said first control block is configured to select said communications circuitry or said charger by frequency switching between the first and second frequencies.

18. The system according to claim 17, the plurality of capacitive elements having a first configuration forming with said antenna at least one of a first resonant circuit having the first frequency as a resonance frequency, and a matched circuit with an impedance compatible with receiving and transmitting information via said antenna at the first frequency; and a second configuration forming with said antenna a second resonant circuit having the second frequency as a resonance frequency.

19. The system according to claim 18, wherein said power supply module is coupled to a voltage reference; and wherein said communications circuitry comprises input and output interfaces, and in the first configuration, the matching circuit is coupled between said antenna and the input and output interfaces; and in the second configuration, the matching circuit is coupled between said antenna and the voltage reference of said power supply module with the input and output interfaces also being coupled to the voltage reference of said power supply module.

20. The system according to claim 19, wherein the plurality of capacitive elements comprises:

a first capacitor coupled in parallel with the pair of terminals of said antenna; and a plurality of second capacitors respectively coupled in series between the terminals of said antenna and the input and output interfaces; and wherein said first control block further comprises a first controllable switching module coupled between the input and output interfaces and the voltage reference of said power supply module and having a first state in which a connection between the input and output interfaces and the voltage reference of said power supply module is prevented, with the matching circuit then being in the first configuration, and a second state in which a connection between the input and output interfaces to the voltage reference of said power supply module is allowed, with the matching circuit then being in the second configuration; and said communications circuitry further comprising a first control circuit configured to selectively control said first controllable switching module.

21. The system according to claim 20, wherein said first controllable switching module comprises a plurality of transistors respectively coupled between said plurality of second capacitors and the voltage reference of said power supply module, with said plurality of transistors each comprising a gate and being controlled by a first control signal delivered by said first control circuit to said gates.

22. The system according to claim 17, wherein said second control block is coupled between said antenna and said power supply module, and has a first state in which a connection between said antenna and said power supply module is prevented, with said charger then being non-operational; and a second state in which said antenna is coupled to said power supply module, with said charger being operational; and said communications circuitry further comprising a first control circuit configured for selectively controlling said second control block.

23. The system according to claim 22, further comprising:

a power supply management unit coupled between said rectifier bridge and said power supply module;

wherein said second control block is coupled between said rectifier bridge and said power supply management unit, with said transistor comprising a PMOS transistor.

24. The system according to claim 23 wherein said second control block comprises an NMOS transistor coupled between the gate of said PMOS transistor and a voltage reference and being controlled by a first control signal delivered by said first control circuit so as to turn said PMOS transistor off or on.

* * * * *